United States Patent [19]

Webb

[11] Patent Number: 5,738,307

[45] Date of Patent: Apr. 14, 1998

[54] PARACHUTE WITH SLIDABLE AUXILIARY CANOPY FOR OPENING ASSIST

[75] Inventor: David B. Webb, Fort Erie, Canada

[73] Assignee: Irvin Industries Canada, Ltd., Fort Erie, Canada

[21] Appl. No.: 622,451

[22] Filed: Mar. 22, 1996

[51] Int. Cl.$^6$ .................................................. B64D 17/36
[52] U.S. Cl. .................................................. 244/152
[58] Field of Search .................................. 244/142, 145, 244/152, 147, 146

[56] References Cited

U.S. PATENT DOCUMENTS

| | | | |
|---|---|---|---|
| 2,384,127 | 9/1945 | Nailor | 244/152 |
| 2,754,074 | 7/1956 | Schade | 244/152 |
| 4,117,994 | 10/1978 | Webb | 244/152 |

FOREIGN PATENT DOCUMENTS

| | | | |
|---|---|---|---|
| 2514724 | 4/1983 | France | 244/152 |
| 66240 | 10/1928 | Sweden | 244/152 |

*Primary Examiner*—Galen L. Barefoot
*Attorney, Agent, or Firm*—Crossetta & Associates

[57] ABSTRACT

This invention relates to a novel parachute comprising an auxiliary canopy which is slidably mounted to restrictor lines to enable automatic sliding through variable positions during deployment of the parachute for controlling the speed and geometry of main canopy inflation.

22 Claims, 5 Drawing Sheets

PARACHUTE WITH SLIDABLE AUXILIARY CANOPY FOR OPENING ASSIST

This invention relates to parachutes, and more particularly to novel parachutes comprising an auxiliary canopy which automatically slides through variable positions in respect to the mouth of the main canopy for controlling the speed and geometry of main canopy inflation.

BACKGROUND OF THE INVENTION

A persistent problem with parachutes is the control of the rate and geometry of main canopy inflation under extreme conditions of deployment. Control of main canopy inflation is directly associated with the size and geometry of the opening at the mouth of a parachute at deployment. If the geometry of the opening at the mouth inadvertently changes at deployment from its design parameters, for example by support line interference and/or canopy inversion, the rate, amount and flow of air to the main canopy can delay or even prevent appropriate canopy opening to provide the necessary support for safely landing the load.

High speed aircraft have emergency escape systems such as ejection seats and the like, which are unique in that they must have the ability to deploy parachutes at very high speed and extreme conditions, without expectations of significant parachutist control and guidance, yet have controlled canopy openings which do not exceed human tolerance for deceleration forces. In order to meet such functional parameters, they must incorporate assured protection from deployment failures and particularly inflation failures associated with the size and geometry of parachute mouth openings through a wide range of speeds and conditions.

U.S. Pat. No. 2,566,585 discloses the difficulties associated with deploying a parachute at high speeds, particularly the persistence of "streamers", wherein gores of the parachute are sucked or blown into the mouth of the parachute and interfere with air entering the mouth of the parachute so that adequate air does not reach the inner surfaces of the canopy and "malfunctions", where the parachute is blown inside out and/or suspension lines become fouled over the canopy and prevent the canopy from fully opening.

As a proposed solution to such difficulties, the patent discloses an aerodynamic baffle which is slidably mounted to suspension lines which converge downwardly from the periphery of the canopy and is movable along the suspension lines to control the opening of the canopy. The baffle is said to be preferably square, to preferably comprise mounting rings spaced at its four corners for slidable mounting along an equal number of load harness webs, and have resilient members along the margins of the baffle connecting between mounting rings for expanding and contracting the perimeter of the baffle in response to air pressure against same.

The baffle is said to be packed inside the folds of the main canopy, with the rings arranged on the suspension lines at a point closest to the periphery of the main canopy. At initial deployment, prior to inflation of the main canopy, the baffle is positioned to extend internally within the main canopy and above the periphery of the canopy, restraining the mouth of the canopy from opening and confining and organizing the suspension lines within its spaced rings. The restraining action of the baffle is said to reduce deployment forces on the parachutist by spreading them between immediate inflation of the smaller baffle and thereafter gradual inflation of the main canopy. The confined organization of the lines within the rings is said to prevent wide separation of the suspension lines and thus reduce the possibility of their fouling. As the baffle reaches inflation, air passes around its periphery to the main canopy and it gradually inflates. The suspension lines are pulled outwardly through the rings of the baffle as the main canopy inflates, shortens the amount of suspension line extending from the load to the periphery of the baffle and causes the periphery of the baffle to move downwardly below the periphery of the main canopy.

Thus, the arrangement disclosed by the patent causes a distinct two stage deployment of the parachute. A first stage wherein the baffle is inflated internally of the main canopy and a second stage wherein the main canopy is inflated through the air flow around the inflated baffle.

One effect of such arrangement is to cause the parachute to open more smoothly and uniformly. Another effect however, is to delay the opening of the main canopy, particularly at high speed deployment but also at low speed deployment. Such delay in opening has made the arrangement imprudent for use as an emergency parachute, in that emergency situations can be at low altitudes where delay in opening can be fatal.

It is an object of this invention to provide a novel parachute having a sliding central canopy arrangement particularly suitable for low altitude deployment.

Another object of the invention is to provide a novel parachute having a sliding central canopy arrangement positioned to control inflation of the parachute.

A further object of the invention is to provide a means for assisting controlled inflation of a parachute canopy, so as to provide a fast initial inflation to various selected initial main canopy mouth diameters to control deceleration forces.

These and other objects of the invention will become apparent from the following recitation of the invention.

SUMMARY OF THE INVENTION

The invention relates to an improved slidable auxiliary canopy rigged in unique combination with main canopy suspension lines of a parachute for control of main canopy inflation.

In the combination of the invention, a slider canopy is slidably arranged on a plurality of restrictor lines, which connect to suspension lines that extend from about the perimeter of a main canopy toward the load. Restrictor lines are attached at one end to an upper part of a suspension line and at the other end to a lower part of such suspension line to form an endless loop with a segment of suspension line. The point of attachment at the upper part of the suspension line is generally at or spaced below the perimeter of the main canopy and the restrictor line is longer than the suspension line segment with which it forms an endless loop.

The slider canopy comprises a plurality of slider means, preferably rings, spaced along about its perimeter in an arrangement suitable for slidably mounting the slider canopy along a plurality of restrictor lines. In a preferred embodiment, a restrictor line is rigged to extend from its lower point of attachment with a suspension line, through a corresponding spaced ring of the slider canopy to its upper point of attachment with the suspension line, such that the ring and thus the canopy can be slidable moved along the restrictor line. A stop means is positioned to restrain the ring from sliding along the restrictor line beyond a spaced distance from the upper point of attachment to the suspension line.

The slider canopy is sized to a diameter and stops are arranged along the restrictor lines, such that a space of defined minimum size, generally greater than about 6 inches and preferable from about 6 to about 36 inches, is formed between the perimeter of the mouth of the main canopy and the perimeter of the slider canopy. At packing, the slider canopy is generally folded within the main canopy with the slider canopy rings arranged close to or against the stops of the restrictor lines.

At high velocity deployment, center slider chute axial aerodynamic loading is applied, which immediately fully inflates the slider canopy and organizes the main canopy into a repeatable, symmetrical initial mouth opening, with the main canopy streaming behind, for controlled main canopy inflation. The positioning of the rings along the restrictor line translate the initial central slider canopy force into a hard reefing force applied to the main canopy lines, through the rings at the periphery of the slider canopy and through a triangle formed by the legs of the restrictor line and the suspension line of the load. The presence of the stop on the restrictor line spaced from the perimeter of the main canopy establishes a minimum space between the mouth of the main canopy and the perimeter of the slider canopy which cannot be closed by the action of the initial hard reefing force.

At the onset of deployment, the geometric relationship of the restrictor line with the suspension line is the formation of a generally obtuse triangle, with the restrictor line being divided into two legs meeting at the ring on the perimeter of the inflated slider canopy and the suspension line forming the base.

Immediately at inflation of the slider canopy, air flow to the main canopy increases from flow about the perimeter of the inflated slider canopy, through the inlet space between the perimeter of the slider canopy and the mouth of the main canopy expediting the inflation of the main canopy. Initially, the placement of the spacers assures a geometric symmetrically balanced inlet area around the slider canopy. As the main canopy inflates and decelerates, its normal sideways inflation movement overcomes the central chute axial forces with greater authority than conventional slider action due to the triangulation of the restrictor lines.

As the main canopy inflates to it's initial reefed diameter, the velocity of the main canopy decays and the center chute load reduces as a function of the square root of the assembly velocity. At a main canopy velocity, which is dependent upon the initial relative sizes of the main canopy mouth diameter and the inflated slider canopy diameter and its drag coefficient, the initial forces of the main canopy will overcome the reefing effect of the slider canopy pressing against the restrictor line stops. Since the diameter of the slider canopy and the length of the suspension lines are fixed, restrictor line slides through the rings and the slider canopy will start to move down the restrictor lines with very little residual main canopy reefing effect as the velocity decays. As the slider canopy moves toward the load, the triangle formed by the suspension line and restrictor line changes in geometry to acute.

As the assembly velocity decreases, the central chute load is further reduced toward zero, and normal sideways inflation of the canopy will assist and/or allow the slider canopy to move further down the restrictor lines to a dashed position.

With fixed dimension main and slider canopies the acting geometry of the triangle and speed with which it changes during main canopy deceleration is primarily dependent upon the velocity of the main canopy and the initial inlet area of the main canopy mouth selected. The slider canopy finally slides toward a dashed state to a geometry wherein the restrictor line tension falls virtually to zero, with the weight of the load being fully supported by the suspension lines.

At low deployment velocities, initial center chute axial loading is lower than at high velocity, but is sufficient to immediately inflate the slider canopy and maintain the mouth of the main canopy organized for faster main canopy inflation.

The main canopy and suspension line rigging in which the invention is effective is not seen as being generally limited to specific sizes, shapes or types. There are many different types and designs of main canopies which appear adaptable to the invention such as vented or non-vented hemispherical, conical, triangular, square, annular, ribbon, tandem and the like which can be made of a wide variety of flexible materials, including air permeable and/or impermeable materials and the like.

In a similar manner, a variety of suspension line rigging appears adaptable to the invention. Main canopy suspension lines can be connected to loops of parachute line tape which generally run along the seams of joined gores generally comprising the main canopy and extend beyond the periphery of the main canopy and/or may be connected to the main canopy through loops placed at the peripheral border of the canopy or the like, or can extend about the canopy, such as along gore seams, to a top crown of the canopy.

Restrictor lines can be connected at any convenient point along a suspension line and in one embodiment, suspension lines and restrictor lines connect to a common loop at a point spaced from the perimeter of the main canopy. The length of restrictor lines is generally sized to the length from the point of its attachment on the lower part of a suspension line to its point of upper attachment, plus the minimum distance to be maintained from the sliding means to the perimeter of the main canopy.

The slider canopy can be vented or non-vented and can be made of a variety of flexible materials and be in a variety of configurations as disclosed for the main canopy. Generally however, it is preferred that the slider canopy take the same general configuration as the main canopy. In a preferred embodiment of the present invention the slider canopy is circular and comprises a central vent.

The slider canopy is fitted with a plurality of sliding means, such as loops, rings, connectors or the like, in spaced arrangement around about the periphery of the canopy for the restrictor lines to slide through. Generally, sliding means are preferably positioned close to or at the perimeter of the slider canopy but embodiments are contemplated wherein such are spaced from the perimeter. In a preferred embodiment, the sliding means comprises rings which are connected to parachute tape which extends over the crown of the slider canopy.

The sliding means are generally about evenly spaced around about the periphery of the slider canopy in positions corresponding to balanced restrictor line correspondence with suspension lines of the main canopy.

Though each restrictor line is generally preferred to have its own corresponding slider means at the slider canopy, such is not required and it is contemplated that more than one restrictor line may share a slider means. Similarly, each suspension line may have a corresponding restrictor line attached thereto, but such is not required. In other embodiments it is contemplated to have a lesser number of restrictor lines than suspension lines, with the placement of restrictor lines being in balanced spaced arrangement among the suspension lines. A restrictor line may be attached at the upper end to one or more than one suspension lines and at the lower end to a single line or two or a web of suspension lines.

The arrangement of stops is to provide a fixed initial packing position of the sliding means along the restrictor line at the deployment of the chute. Such fixed position also provides a minimum circumferential opening between the main canopy perimeter and the slider canopy and guards against geometric positioning of the slider canopy to an extreme side of the mouth of the main canopy through deployment. The stops generally become non-functional after initial inflation of the main canopy. Stops can be any convenient means to prevent the sliding means from moving past a fixed point on a restrictor line, and generally merely comprise a mass attached to the restrictor line over which the slider means cannot pass. In a preferred embodiment a slider means comprises a ring and a stop comprises a disk, ring or the like which is mounted along the restrictor line and is sized larger than the slider ring.

The foregoing and other features and advantages of the invention will become apparent to those skilled in the art upon a reading of the following detailed description when taken in conjunction with the drawings wherein there is shown and described an illustrated embodiment of the invention.

DETAILED DESCRIPTION OF THE INVENTION

Figure 1:
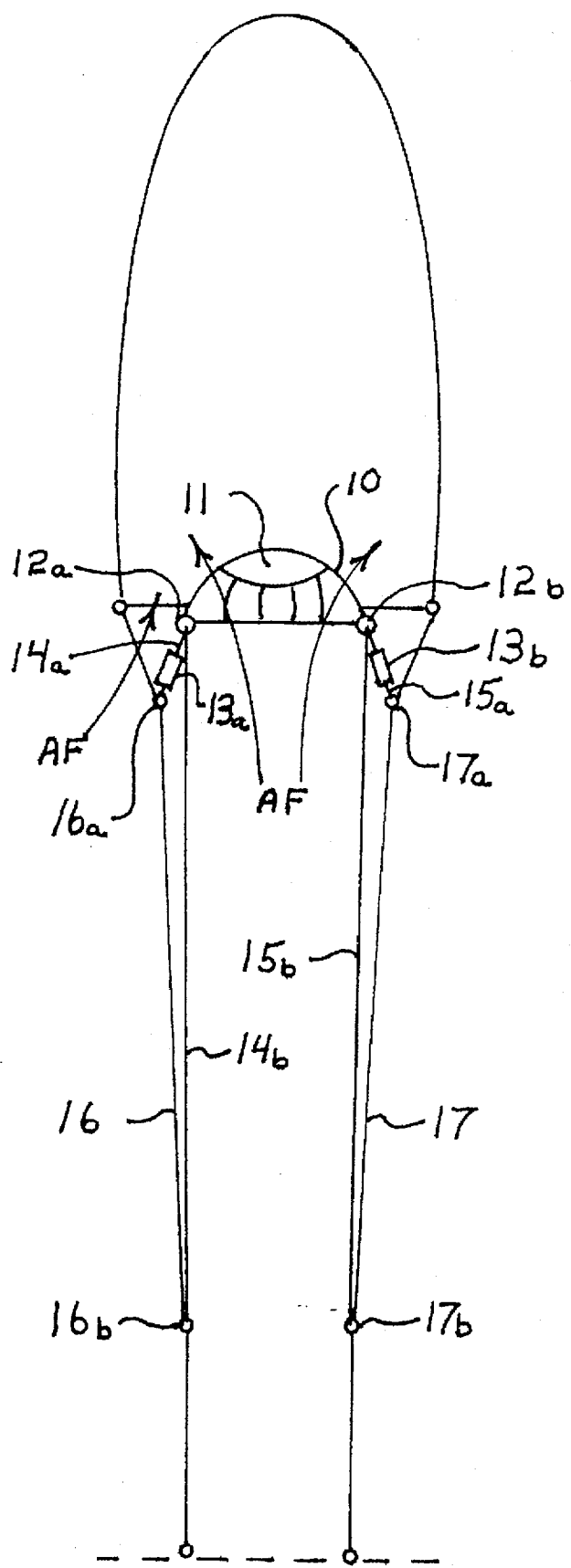
FIG. 1 is a diagrammatic illustration of an initial inflation stage of a parachute embodying the slidable canopy of the present invention.

Referring first to FIG. 1 of the drawings wherein a center auxiliary canopy 10, comprising a central vent 11, is shown fully inflated at an initial deployment stage. Rings 12a and 12b are shown positioned as at packing, being at about stops 13a and 13b, with restrictor lines 14 and 15 passing through rings 12a and 12b respectively and being attached to an upper part of suspension lines 16 and 17, at 16a and 17a respectively, and at a lower part 16b and 17b respectively.

In the initial deployment stage shown in FIG. 1, auxiliary canopy 10 is shown as fully inflated and imposing hard reefing moments of force along legs 14a,14b and 15a,15b of restrictor lines 14 and 15 and through suspension lines 16 and 17. Considerably lessor force is imposed from the main canopy at this time. Coincidentally, air flow to the slider canopy 10 and main canopy 20 are shown by arrows AF. As can be seen the triangle formed by the restrictor lines and the suspension line is generally obtuse at this stage with the angle between the suspension line segments defined by 16a–16b and 17a–17b, and respective restrictor line legs 14a and 15a being obtuse.

Figure 2:
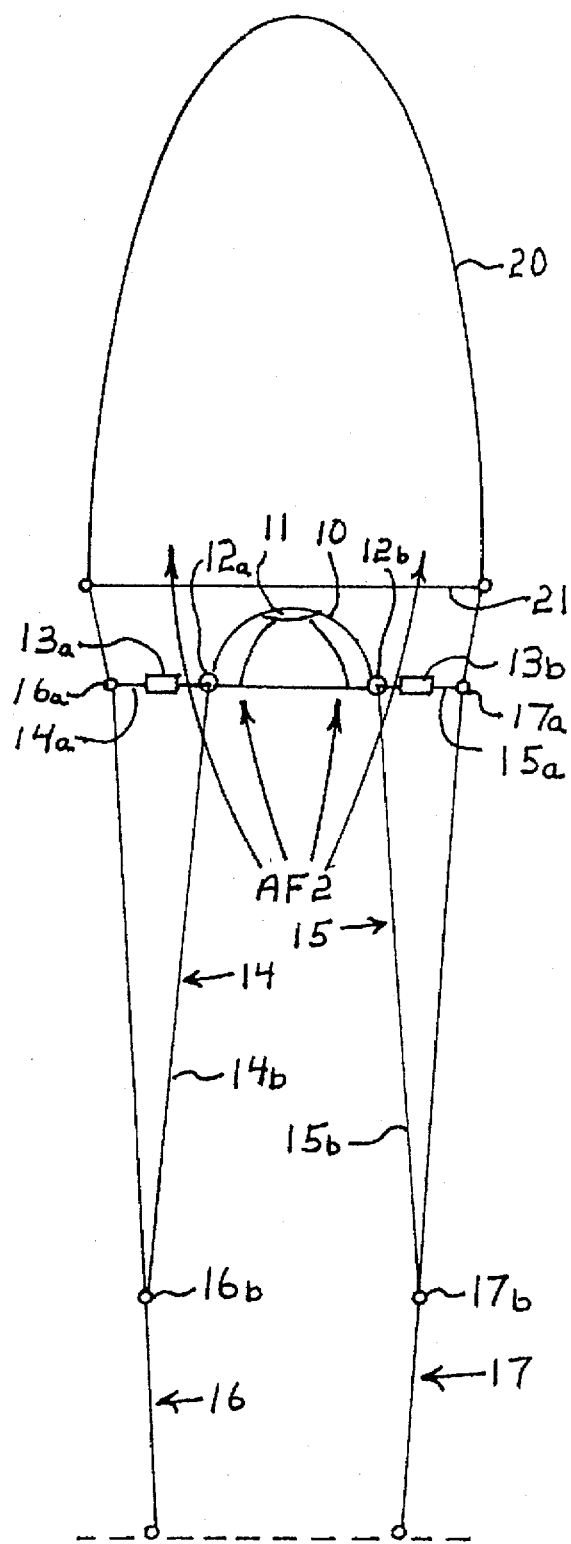
FIG. 2 is a diagrammatic illustration of the parachute of FIG. 1 at an intermediate inflation stage.

FIG. 2 shows main canopy 20 at an intermediate inflation stage wherein slider canopy 10 remains fully inflated, but the mouth 21 of main canopy 20 has opened from its initial deployment position and the length of legs 14a and 15a of restrictor lines 14 and 15 have increased as the restrictor line slides through rings 12a and 12b. Anti-reefing moments of force from main canopy 20 along suspension lines 16 and 17 begin increasing as the main canopy fills, with sideway forces opening the mouth of the main canopy as it exceeds the central canopy reefing force along legs 14a and 15a of restrictor lines 14 and 15. Lengthening of legs 14a and 14b is accompanied by sliding of slider canopy 10 downwardly from the mouth 21 of the main canopy 20 and gradual change of the triangle formed by the restrictor lines and the suspension line to an acute geometry, with anti-reefing force from the main canopy increasing over reefing forces from the slider canopy. Coincidentally, air flow to the slidable canopy and main canopy are shown by arrows AF2.

Figure 3:
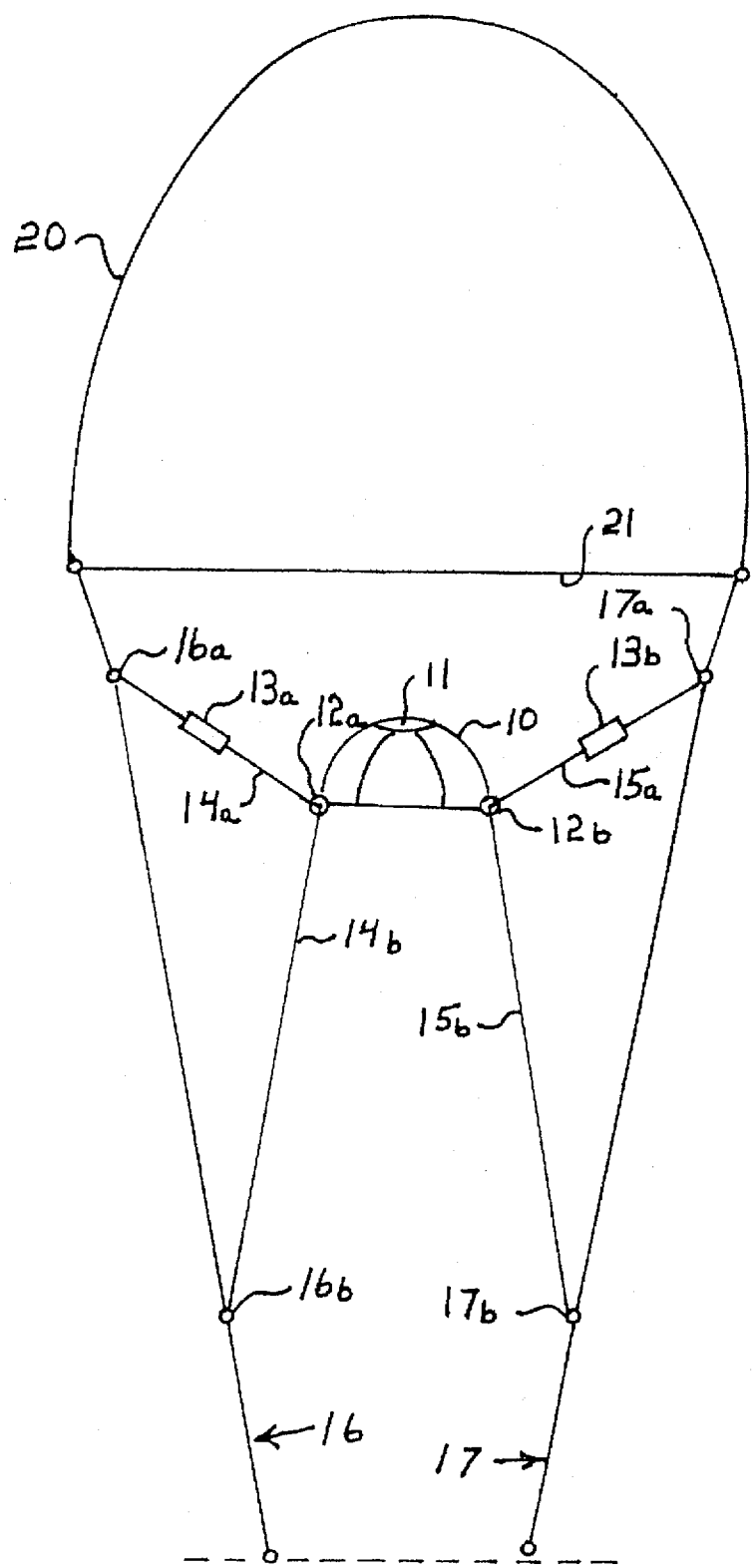
FIG. 3 is a diagrammatic illustration of the parachute of FIG. 1 at a final inflation stage.

FIG. 3 shows main canopy 20 at a final inflation stage wherein slidable canopy 10 remains fully inflated and the mouth 21 of main canopy 20 has opened but is still less than its maximum opening. The length of legs 14a and 15a of restrictor lines 14 and 15 have increased as the restrictor line slides through rings 12a and 12b, forcing slider canopy 10 further down the restrictor lines and further reducing its reefing effect and further increasing the anti-reefing moments of force from main canopy 20 along suspension lines 16 and 17.

Figure 4:
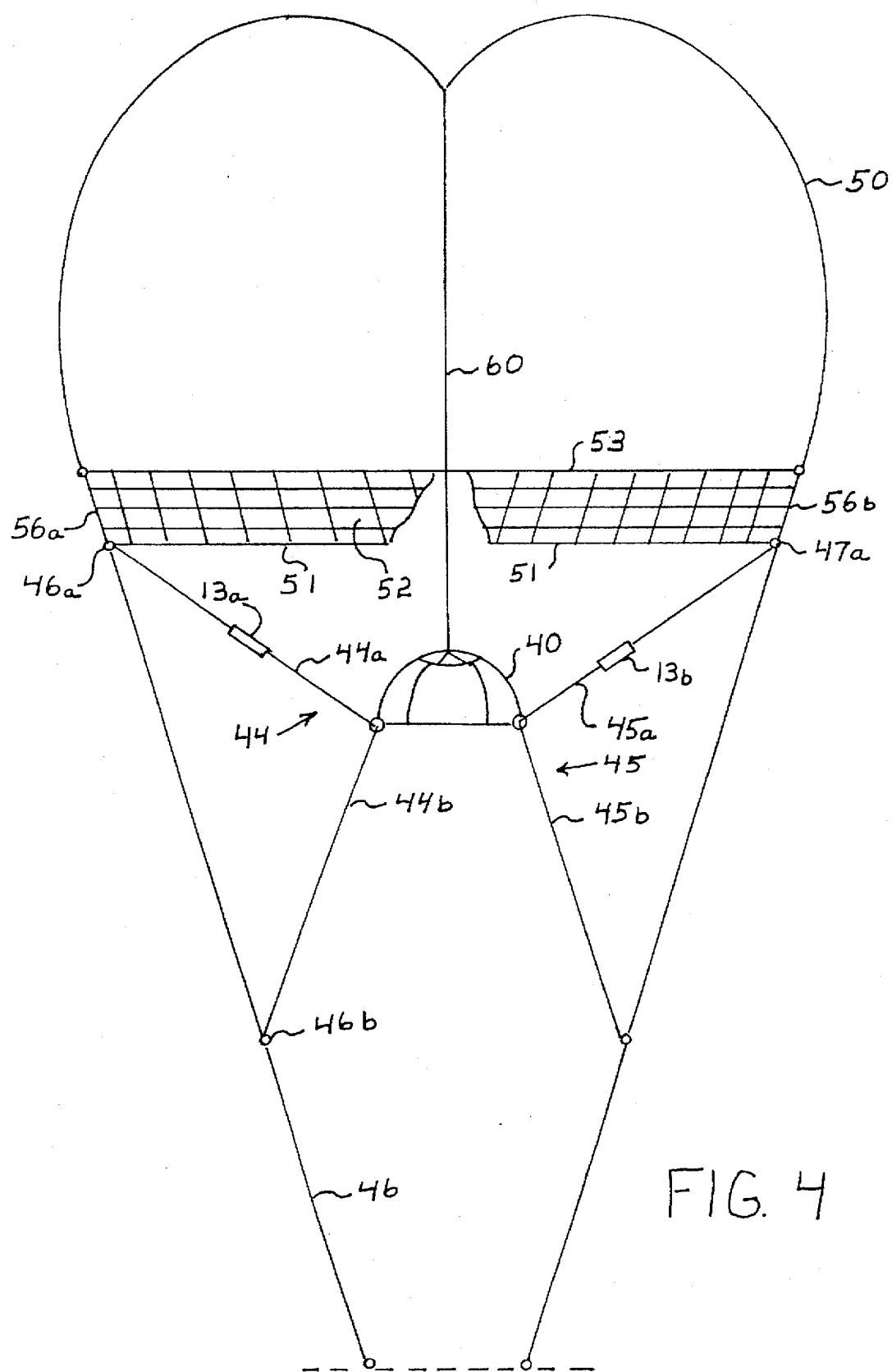
FIG. 4 is a diagrammatic illustration of another parachute of the invention at a full open steady descent stage.

FIG. 4 illustrates another embodiment of the invention, main canopy 50 being at full open steady descent stage with mouth 51 opened to its maximum opening and slider canopy 40 at a position where legs 44a,44b and 45a,45b of restrictor lines 44 and 45 have reached a dashed state, with anti-reefing force from main canopy 50 being along suspension lines 46 and 47.

Main canopy 50 comprises a net skirt 52, arranged to further reduce the possibility of suspension line fouling and/or canopy inversion. Generally the net skirt comprises from about 2.5 to about 4.5 inch grid spacing and is arranged so that upon inflation of the main canopy the skirt forms a downward extending inverted cone. The upper border of net skirt 52 is connected to peripheral border 53 of the main canopy and the skirt extends downward from about 6 to about 30 inches and preferably about 18 inches from the peripheral border of the main canopy. Ends 56a and 56b of parachute line tape extend over the canopy and lower border 51 of net skirt 52 are connected with restrictor lines 44,45 and suspension lines 46,47 at 46a and 47a respectively. Position line 60 extends from the center vent of canopy 40 to the center vent of main canopy 50 to maintain centering of canopy 40.

Figure 5:
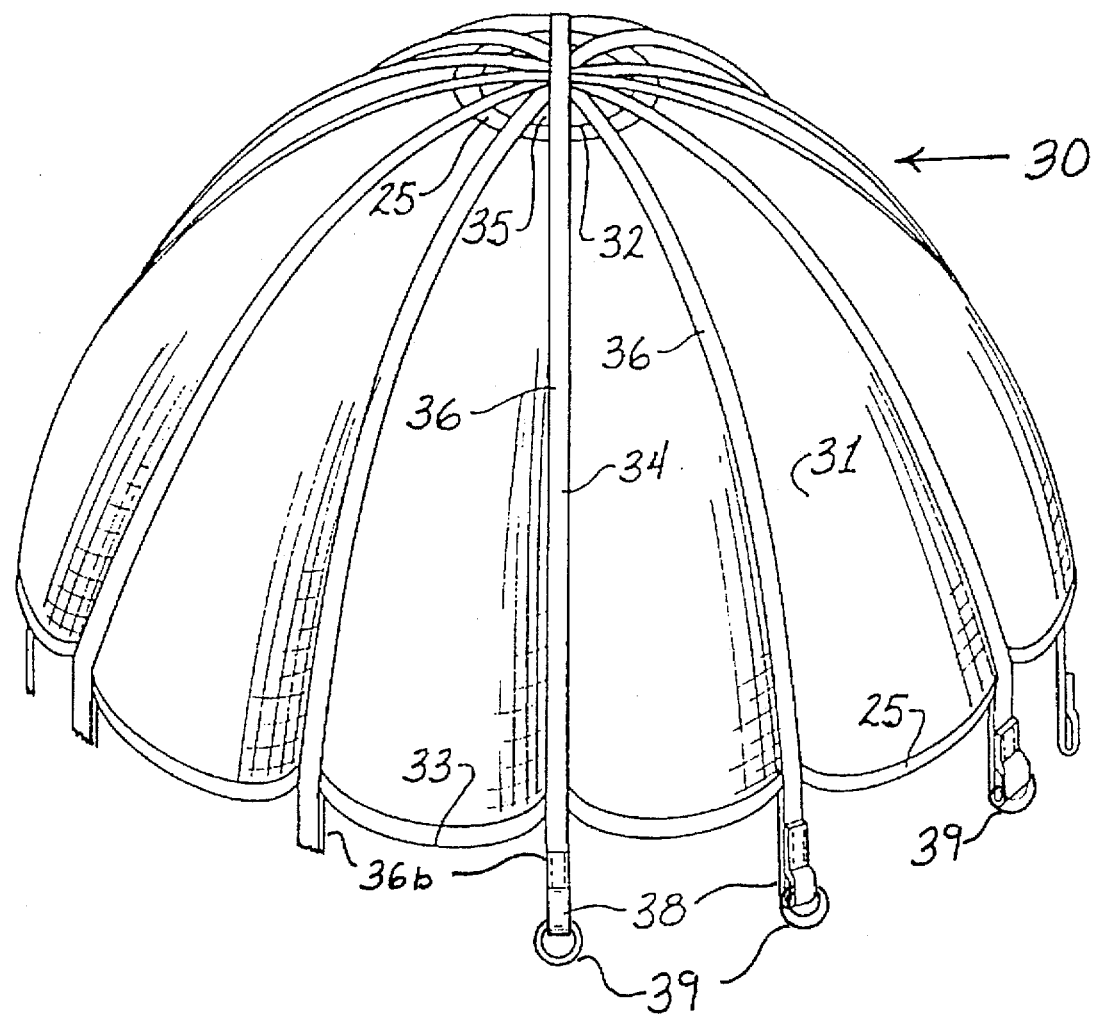
FIG. 5 is a partial sectional perspective view of an embodiment of a slidable canopy of the invention.

FIG. 5 illustrates a preferred embodiment of a slidable canopy of the invention. Canopy 30 is of the conical variety and comprises a plurality of interconnected gores 31, arranged about exhaust vent 35 and form interior peripheral border 32 and exterior peripheral border 33 of the canopy. The gores are generally trapezoidal and/or generally triangular or ogive in configuration and their interconnected borders 34 are generally sewn and preferably reinforced with parachute line tape. Ends 36b of parachute line tape 36 are shown as being extended and comprising loops 38 which comprise rings 39 through which restrictor line is slidably mounted.

I claim:

1. In a parachute, the combination comprising a main canopy arranged generally about a central axis and having a perimeter defining a mouth; a plurality of suspension lines extending from about the perimeter of the main canopy downwardly toward a load when the main canopy is fully extended; an auxiliary canopy, arranged about a central axis of the mouth of said main canopy, comprising a plurality of slider means spaced along about its perimeter; a plurality of restrictor lines, spaced to engage slider means, a restrictor line being connected at an upper end to an upper part of a corresponding suspension line and at a lower end to a lower part of said corresponding suspension line; stop means, arranged along an upper portion of a restrictor line; wherein said stop means, is spaced from the perimeter of the mouth of said main canopy and restrains said slider means from sliding to said perimeter of said mouth of said main canopy.

2. The parachute of claim 1 wherein said upper end of said restrictor line connects with said suspension line at a point spaced from the perimeter of said main canopy.

3. The parachute of claim 2 wherein said upper end of said restrictor line connects with said suspension line at a point where said suspension line connects to said main canopy.

4. The parachute of claim 1 wherein said lower end of said restrictor line connects to said suspension line at a point spaced above said load.

5. The parachute of claim 4 wherein said lower end of said restrictor line connects to a means for attaching a suspension line.

6. The parachute of claim 1 wherein said slider means comprises a ring.

7. The parachute of claim 1 wherein said main canopy comprises a skirt arranged about the perimeter of its mouth.

8. The parachute of claim 1 comprising a positioning line extending from about the center of the said canopy to about the center of said auxiliary canopy.

9. The parachute of claim 1 wherein the main canopy comprises a central vent.

10. The parachute of claim 1 wherein the auxiliary canopy comprises a central vent.

11. The parachute of claim 1 wherein the main canopy is conical.

12. The parachute of claim 1 wherein stops are arranged to maintain the exterior periphery of the mouth of the main canopy more than about 6 inches from the periphery of the auxiliary canopy at deployment.

13. The parachute of claim 1 wherein said restrictor lines are sized such that during initial inflation of said parachute, the perimeter of the fully inflated auxiliary canopy is positioned in about the plane of the perimeter of the main canopy and an apex of an air inflation crown of the auxiliary canopy is positioned higher than said periphery of the main canopy.

14. The parachute of claim 1 wherein joined borders of gores of said main canopy comprise reinforcing means having ends which extend from said exterior periphery of said main canopy and connect with said suspension lines.

15. The parachute of claim 14 wherein said reinforcing means comprise loop means.

16. The parachute of claim 1 wherein extension lines extend over the main canopy.

17. The parachute of claim 1 wherein joined borders of gores of said auxiliary canopy comprise reinforcing means having ends which extend from the exterior periphery of said auxiliary canopy.

18. The parachute of claim 17 wherein said ends comprise slider means for engaging a restrictor line.

19. The parachute of claim 1 wherein said restrictor lines engage said main suspension lines from about 6 to about 30 inches from said exterior periphery of said main canopy at initial deployment of the parachute.

20. The parachute of claim 1 wherein a plurality of spaced apart auxiliary canopy suspension lines extend radially inward from the exterior periphery of said canopy, along a plurality of borders of joined gores comprising said auxiliary canopy and interconnect at about the central axis of said canopy.

21. The parachute of claim 20 wherein said suspension lines comprise parachute tape arranged to reinforce the joined borders of said gores.

22. The parachute of claim 21 wherein ends of said suspension lines comprise slider means.

* * * * *